US010255421B2

(12) United States Patent
Lu et al.

(10) Patent No.: US 10,255,421 B2
(45) Date of Patent: Apr. 9, 2019

(54) WORKING METHOD FOR MULTI-SEED ONE-TIME PASSWORD

(71) Applicants: Feitian Technologies Co., Ltd., Beijing (CN); Hypersecu Information Systems, Inc., Richmond (CA)

(72) Inventors: Zhou Lu, Beijing (CN); Huazhang Yu, Beijing (CN); Mingji Li, Richmond (CA)

(73) Assignee: Feitian Technologies Co., Ltd., Beijing (CN)

(*) Notice: Subject to any disclaimer, the term of this patent is extended or adjusted under 35 U.S.C. 154(b) by 0 days.

(21) Appl. No.: 15/115,938

(22) PCT Filed: Aug. 21, 2015

(86) PCT No.: PCT/CN2015/087772
§ 371 (c)(1),
(2) Date: Aug. 2, 2016

(87) PCT Pub. No.: WO2016/095555
PCT Pub. Date: Jun. 23, 2016

(65) Prior Publication Data
US 2017/0293751 A1    Oct. 12, 2017

(30) Foreign Application Priority Data
Dec. 15, 2014  (CN) .......................... 2014 1 0771841

(51) Int. Cl.
*G06F 21/34*  (2013.01)
*H04L 9/32*   (2006.01)
(Continued)

(52) U.S. Cl.
CPC .............. *G06F 21/34* (2013.01); *G06F 21/31* (2013.01); *H04L 9/0891* (2013.01);
(Continued)

(58) Field of Classification Search
CPC ......... G06F 21/34; G06F 21/31; H04L 9/3228
(Continued)

(56) References Cited

U.S. PATENT DOCUMENTS 8,190,906 B1 * 5/2012 Elbeery .................. G06F 21/34
713/156
8,590,030 B1 * 11/2013 Pei ...................... H04L 63/0838
726/9
(Continued)

FOREIGN PATENT DOCUMENTS

CN          203870558    * 10/2014

OTHER PUBLICATIONS

Martin, "Authenticate Once and Be Done: User-Centric Authentication Through Rich Device Capabilities", 2014, Intel, vol. 18, pp. 8-28 (Year: 2014).*

*Primary Examiner* — Shawnchoy Rahman
*Assistant Examiner* — Gregory A Lane
(74) *Attorney, Agent, or Firm* — Hammer & Associates, P.C.

(57) ABSTRACT

Disclosed is a working method for a multi-seed one-time password, which falls within the field of information security. The method comprises: powering and initializing a one-time password, opening a total interrupt, initializing the state of a system, and then entering a sleep mode; when the one-time password detects the interrupt, awakening the one-time password from the sleep mode, and entering an interrupt processing flow; after the interrupt processing flow is ended, checking each awakening flag; and executing a processing flow corresponding to the set awakening flag. According to the present invention, a user can burn seed data into the one-time password by operating the one-time password, and can update the seed data in the one-time password. In addition, according to the present invention, the one-time password is capable of storing and managing a (Continued)

Figure 1:
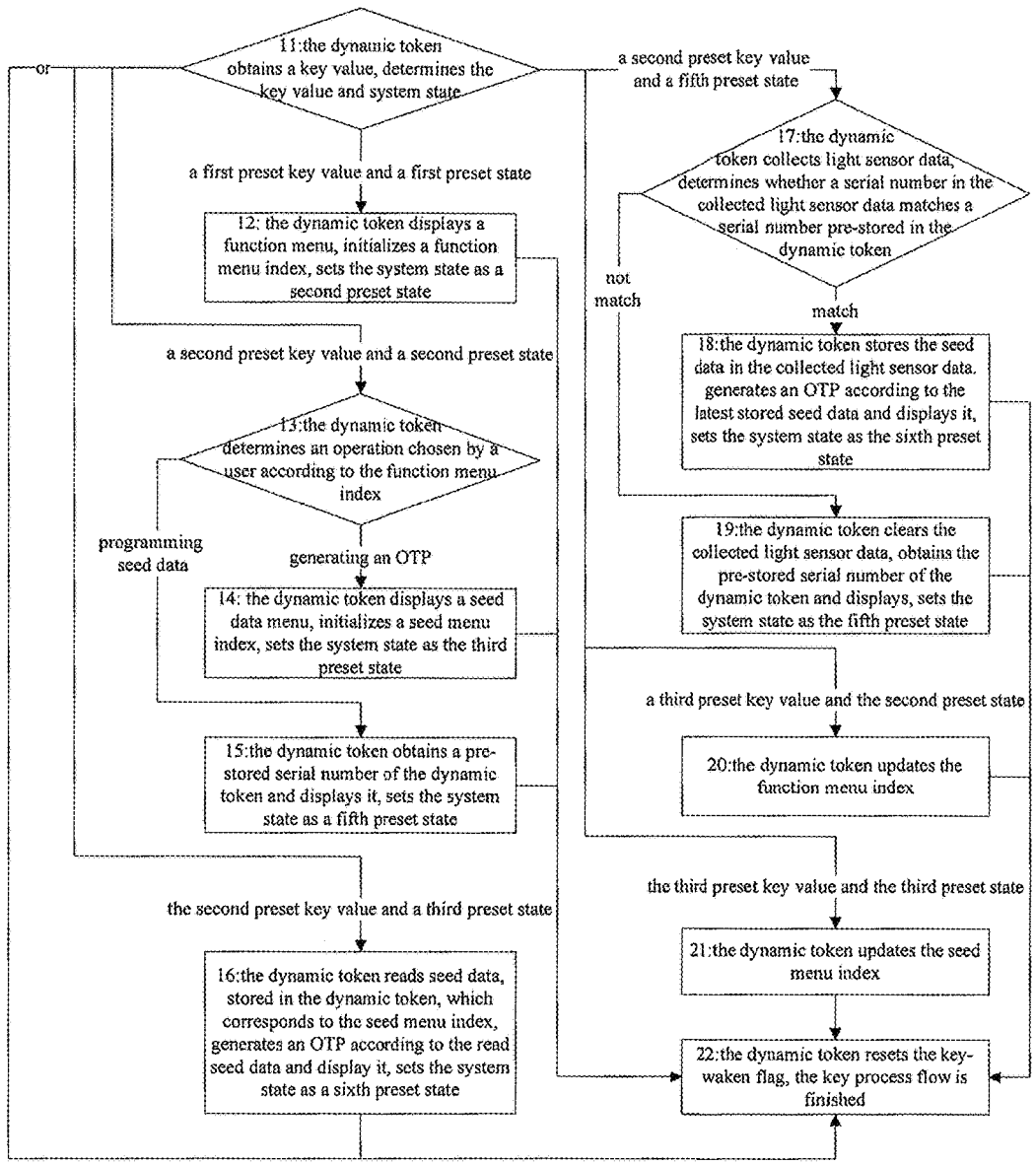

plurality of seeds. In a process of using the one-time password, a one-time command can be generated using the corresponding seed data according to the selection from the user, which is convenient for the user to use. In addition, the reliability and security of the seed data are guaranteed by means of binding between a unique identifier of the one-time password and the seed data.

18 Claims, 6 Drawing Sheets

(51) Int. Cl.
    *G06F 21/31*     (2013.01)
    *H04L 9/08*     (2006.01)

(52) U.S. Cl.
    CPC .... *H04L 9/3228* (2013.01); *G06F 2221/2115* (2013.01); *G06F 2221/2153* (2013.01); *H04L 9/3234* (2013.01)

(58) Field of Classification Search
    USPC ............................................................ 726/9
    See application file for complete search history.

(56) References Cited

U.S. PATENT DOCUMENTS

| | | | |
|---|---|---|---|
| 8,934,633 B2 * | 1/2015 | Tomaru | H04L 9/0858 340/5.26 |
| 9,674,170 B2 * | 6/2017 | Roth | H04L 63/08 |
| 2008/0209224 A1 * | 8/2008 | Lord | H04L 63/083 713/185 |
| 2011/0035515 A1 | 2/2011 | Quach et al. | |
| 2011/0307699 A1 * | 12/2011 | Fielder | H04L 63/123 713/172 |
| 2015/0256535 A1 * | 9/2015 | Abbate | G06F 9/485 726/9 |

* cited by examiner

WORKING METHOD FOR MULTI-SEED ONE-TIME PASSWORD

FIELD OF THE INVENTION

The present invention relates to a working method of multi-seeded dynamic token, which belongs to the field of information security.

PRIOR ART

In prior art, One-time Password (OTP) is an unpredictable password composed of random numbers, which is generated via a special algorithm. The OTP is a safe and convenient account security technology, in which each OTP is valid for only one login session or transaction. When a user is authenticated, he needs to enter an OTP as well as an account and a static password, login or transaction of the user is successful if all of the OTP, the password and the account are authenticated successfully, in this way, it is ensured that the user's identity is legitimate and unique. The most important advantage addressed by OTP is that a hacker cannot counterfeit an identify of a legitimate user because OTPs entered by the user are different from each other. The OTP authentication is one of the most security way to authenticate user's identity, which can prevent multiple network problems leading to loss of property or information of a user, such as fake website, hackers and Trojan. At present, the OTP is applied in many fields, such as E-banks, online games, ICT, E-government and enterprises.

At the moment, seed data in a dynamic token is inserted in the dynamic token by a manufacturer before the dynamic token leaves the factory, a user cannot update the seed data once the dynamic token is activated, and the dynamic token is just applied in one way, thus, it is inconvenient and waste of hardware resources.

SUMMARY OF THE INVENTION

The present invention provides a working method of a multi-seeded dynamic token, in which a dynamic token can store and manage multiple seeds, in this way, it is more convenient for a user, and seed data is more secure and more reliable.

Thus, the present invention provides a wording method of multi-seeded dynamic token, which includes:

Step S1, powering on and initializing a dynamic token, turning on a general interrupt, setting a system state as a first preset state, making the dynamic token enter into a sleep mode, and the dynamic token waiting for being waken;

Step S2, waking up the dynamic token when an interrupt is detected, making the dynamic token enter into an interrupt process flow, executing Step S3 after the interrupt process flow is finished;

in which the interrupt process flow including: determining, by the dynamic token, whether a key-interrupt flag is set, if yes, setting a key-waken flag and resetting the key-interrupt flag, and the interrupt process flow is finished; otherwise, the interrupt process flow is finished; in which, a key interrupt is triggered when a key on the dynamic token is pressed, the key-interrupt flag is set;

Step S3, checking, by the dynamic token, the key-waken flag, entering into the key process flow in case that the key-waken flag is set, reentering into a sleep mode when the key process flow is finished, waiting for being waken, and returning to Step S2;

in which the key process flow includes:

Step a, obtaining, by the dynamic token, a key value, determining the key value and the system state, executing Step b in case that the key value is a first preset key value and the system state is a first preset state; executing Step c in case that the key value is a second preset key value and the system state is a second preset state; executing Step d in case that the key value is the second preset key value and the system state is a third preset state; executing Step e in case that the key value is the second preset key value and the system state is a fifth preset state; executing Step f in case that the key value is a third preset key value and the system state is the second preset state; executing Step g in case that the key value is the third preset key value and the system state is the third preset state; otherwise, executing Step h;

Step b, displaying, by the dynamic token, a function menu, initializing a function menu index, setting the system state as the second preset state, and executing Step h;

Step c, determining, by the dynamic token, an operation chosen by a user according to the function menu index, displaying a seed data menu, initializing a seed menu index, setting the system state as the third preset state and executing Step h in case that the operation chosen by the user is generating an OTP; obtaining and displaying a pre-stored serial number of the dynamic token, setting the system state as the fifth preset state and executing Step h in case that the operation chosen by the user is programming seed data;

Step d, reading, by the dynamic token, seed data, which is stored in the dynamic token and is arranged to correspond to the seed menu index, generating and displaying an OTP according to the read seed data, setting the system state as a sixth preset state, and executing Step h;

Step e, collecting, by the dynamic token, light sensor data, determining whether a serial number in the collected light sensor data matches the pre-stored serial number of the dynamic token, if yes, storing seed data which is in the collected light sensor data, and generating and displaying an OTP according to the latest stored seed data, setting the system state as the sixth preset state, and executing Step h; otherwise, clearing the collected light sensor data, obtaining and displaying the pre-stored serial number of the dynamic token, setting the system state as the fifth preset state, and executing Step h;

Step f, updating, by the dynamic token, the function menu index, and executing Step h;

Step g, updating, by the dynamic token, the seed menu index, and executing Step h; and Step h, resetting, by the dynamic token, the key-waken flag, and the key process flow is finished.

Preferably, Step c further including: displaying, by the dynamic token, the seed data menu, initializing the seed menu index, setting the system state as a fourth preset state, and executing Step h in case that the operation chosen by the user is updating seed data.

Correspondingly, in case that the operation chosen by the user is programming seed data, Step c further including: setting an add-seed-data flag;

Step a further including: in case that the key value is the second preset key value and the system state is the fourth preset state, obtaining and displaying, by the dynamic token, the pre-stored serial number of the dynamic token, setting the system state as the fifth preset state, resetting the add-seed-data flag, and executing Step h; in case that the key value is the third preset key value and the system state is the fourth preset state, updating the seed menu index, and executing Step h;

storing the seed data in the collected light sensor data in Step e specifically includes: checking the add-seed-data flag, storing the seed data in the collected light sensor data if the add-seed-data flag is set; replacing the seed data corresponding to the seed menu index with the seed data in the collected light sensor data.

Preferably, Step c further including: displaying the seed data menu, initializing the seed menu index, setting the system state as a tenth preset state and executing Step h in case that the operation chosen by the user is deleting seed data;

correspondingly, Step a further including: deleting, by the dynamic token, the seed data corresponding to the seed menu index, displaying the function menu, initializing the function menu index, setting the system state as the second preset state and executing Step h in case that the key value is the second preset key value and the system state is the tenth preset sate; updating the seed menu index and executing Step h in case that the key is the third preset key and the system state is the tenth preset state.

Preferably, Step e can be substituted as: collecting, by the dynamic token, the light sensor data, determining whether the serial number in the collected light sensor data matches the pre-stored serial number of the dynamic token, if yes, displaying application information in the collected light sensor data, setting the system state as a seventh preset state, and executing Step h; if no, clearing the collected light sensor data, obtaining and displaying the pre-stored serial number of the dynamic token, setting the system state as the fifth preset state, and executing Step h;

correspondingly, Step a further including: storing, by the dynamic token, the seed data in the collected light sensor data, generating and display an OTP according to the seed data, setting the system state as a sixth preset state, and executing Step h in case that the key value is the second preset key value and the system state is the seventh preset state.

Preferably, after the light sensor data is collected, and before whether the serial number in the collected light sensor data matches the pre-stored serial number of the dynamic token is determined, Step e further including: determining whether the collection is finished, if yes, determining whether the serial number in the collected light sensor data matches the pre-stored serial number of the dynamic token; if no, determining whether the collection is overtime, stopping collecting the light sensor data, prompting that the seed data is programmed overtime, obtaining and displaying the pre-stored serial number of the dynamic token, setting the system state as the fifth preset state, and executing Step h in case that the collection is overtime; continuing to collect the light sensor data in case that the collection is not overtime.

Preferably, before the light sensor data is collected, Step e further includes: setting the system state as an eighth preset state; after the light sensor data is collected, and before whether the serial number in the collected light sensor data matches the pre-stored serial number of the dynamic token is determined, the step further includes: determining whether the collection is finished, if yes, determining whether the serial number in the collected light sensor data matches the pre-stored serial number of the dynamic token; otherwise, determining whether the system state is a ninth preset state, stopping collecting the light sensor data, prompting that programming seed data is canceled, obtaining and displaying the pre-stored serial number of the dynamic token, setting the system state as the fifth preset state, and executing Step h in case that the system state is the ninth preset state; continuing to collect light sensor data in case that the system state is not the ninth preset state;

correspondingly, in the interrupt process flow, in case that the key flag is set, before the key-waken flag is set, the flow further including: determining the system state, obtaining and determining the key value in case that the system state is the eighth preset state, setting the system state as the ninth preset state and ending the interrupt process flow in case that the key value is the first preset key value; ending the interrupt process flow in case that the key value is not the first preset key value; setting the key-waken flag in case that the system state is not the eighth preset state.

Preferably, Step a further including: displaying the function menu, initializing the function menu index, setting the system state as the second preset state and executing Step h in case that the key value is the first preset key value and the system state is the third preset state, the fourth preset state or the sixth preset state; setting the system state as the first preset state and executing Step h in case that the key value is the fourth preset key value and the system state is not the first preset state.

Preferably, in Step e, after the seed data in the collected light sensor data is stored, and before an OTP is generated and displayed according to the stored seed data, the step further including: obtaining display precision of the OTP from the collected light sensor data, and storing the obtained display precision with the obtained seed data correspondingly;

correspondingly, generating and displaying an OTP according to the latest stored seed data in Step specifically including: generating an OTP according to the latest stored seed data, intercepting the OTP according to the latest stored display precision of the OTP, and displaying the intercepted data;

generating and displaying an OTP according to the read seed data in Step d specifically including: generating an OTP according to the read seed data, intercepting the generated OTP according to the display precision of the OTP, which is stored in the dynamic token and is arranged to correspond to the read seed data, and displaying the intercepted data.

Preferably, in case that the key-interrupt flag is not set in the interrupt process flow, the flow further including: determining whether a RTC-interrupt flag is set, if yes, setting a RTC-waken flag, resetting the RTC-interrupt flag, the interrupt process flow ending; otherwise, the interrupt process flow ending; in which, when the RTC interrupt is triggered, the RTC-interrupt flag is set;

correspondingly, Step S3 is replaced as: determining, by the dynamic token, whether any set waken flag exists, if yes, checking the RTC-waken flag and the key-waken flag successively, entering into the key process flow in case that the key-waken flag is set, and executing Step S3 when the key process flow is finished; entering into the RTC process flow in case that the RTC-waken flag is set, and executing Step S3 when the RTC process flow is finished; if no, the dynamic token entering into sleep mode and waiting for being waken, and executing Step S2;

in which the RTC process flow includes:

Step X1, decreasing, by the dynamic token, the number of RTC interrupt times progressively, determining whether the number of RTC interrupt times is a preset number of times, if yes, resetting the RTC-waken flag, and executing Step X2; otherwise, executing Step X2;

Step X2, increasing, by the dynamic token, a first parameter and a second parameter progressively, determining respectively whether the first parameter reaches a threshold of the first parameter and the second parameter reaches a threshold of the second parameter; setting the first parameter as its initial value and updating a first time factor stored in the dynamic token in case that the first parameter reaches its threshold; setting the second parameter as its initial value, updating a second time factor stored in the dynamic token and executing Step X3 in case that the second parameter reaches its threshold; executing Step X3 directly in case that neither the first parameter nor the second parameter reaches a corresponding threshold;

Step X3, updating, by the dynamic token, a calibration count value, and determining whether the first parameter equals a preset value, if yes, executing Step X4; otherwise, the RTC process flow ending;

Step X4, determining, by the dynamic token, whether the first parameter and the second parameter need to be calibrated according to the calibration count value and a calibration value pre-stored in the dynamic token, if yes, updating the first parameter, the second parameter and the calibration count value according to the calibration value and the calibration count value, the RTC process flow ending; otherwise, ending the RTC process flow;

furthermore, after the seed data in the collected light sensor data is stored, and before the OTP is generated and displayed according to the latest stored seed data, Step e further including: obtaining mode information of the dynamic token from the collected light sensor data, storing the obtained mode information of the dynamic token with the obtained seed data correspondingly, and setting an event factor corresponding to the obtained seed data if that the mode information the dynamic token is an event mode; storing the obtained mode information of the dynamic token and the obtained seed data correspondingly if the mode information of the dynamic token is a first time mode or a second time mode;

generating an OTP according to the latest stored seed data in Step e specifically including: checking the latest stored mode information of the dynamic token, generating an OTP according to the latest stored seed data and the latest set event factor if the mode information of the dynamic token is an event mode; generating an OTP according to the latest stored seed data and a first time factor in the dynamic token if the mode information of the dynamic token is the first time mode; generating an OTP according to the latest stored seed data and a second time factor in the dynamic token if the mode information is the second time mode;

generating an OTP according to the read seed data in Step d specifically including: checking the mode information of the dynamic token, which is stored in the dynamic token and is arranged to correspond to the read seed data, generating an OTP according to the read seed data and an event factor, which is stored in the dynamic token and is arranged to correspond to the read seed data if the mode information of the dynamic token is an event mode; generating an OTP according to the read seed data and the first time factor in the dynamic token if the mode information of the dynamic token is the first time mode; generating an OTP according to the read seed data and the second time factor in the dynamic token if the mode information of the dynamic token is the second time mode;

before or after generating an OTP according to the latest stored seed data and the latest set event factor, the method further including: updating the latest set event factor;

before or after generating an OTP according to the read seed data and the event factor, which is stored in the dynamic token and is arranged to correspond to the read seed data, the method further including: updating the event factor corresponding to the read seed data;

the RTC process flow further including: checking whether a shell of the dynamic token is opened, clearing sensitive data stored inside the dynamic token and setting a shell-open flag when the shell of dynamic token being opened is checked; in which, the sensitive data including seed data;

before the function menu is displayed in Step b, the step further including: checking whether the shell-open flag is set, if yes, prompting that the dynamic token has destroyed itself and executing Step h; otherwise, displaying the function menu;

in Step X4, when the first parameter and the second parameter do not need to be calibrated, after the first parameter, the second parameter and the calibration count value are updated according to the calibration value and the calibration count value, the method further including: checking the system state, the RTC process flow ending if the system state is the first preset state; decreasing time of auto power-off progressively if the system state is not the first preset state, and if the time of auto power-off equals a preset time, powering off the display screen, setting the system state as the first preset state, and the RTC process flow ending; if the time of auto power-off does not equal the preset time, the RTC process flow ending;

before Step a, the key process flow further including: resetting the time of auto power-off;

in Step e, after the seed data in the collected light sensor data is stored, and before the OTP is generated according to the latest stored seed data and is displayed, the step further including: obtaining an expiry date of the seed data from the collected light sensor data, and storing the obtained expiry date of the seed data with the obtained seed data correspondingly;

in Step X2, when the second parameter reaches the threshold of the second parameter, the step further including: checking whether every seed data expires according to the expiry date of each seed data, stored in the dynamic token, corresponding to each seed data, updating the expiry date of seed data corresponding to the seed data which does not expire, setting an invalidation flag of seed data corresponding to the due seed data;

before an OTP is generated according to the read seed data, Step d further including: checking whether the invalidation flag of the seed data corresponding to the read seed data is set, if yes, prompting that the seed data expires and executing Step h; otherwise, generating an OTP according to the read seed data;

determining, by the dynamic token, whether the first parameter and the second parameter need to be calibrated according to the calibration count value and the calibration value pre-stored in the dynamic token specifically including: determining, by the dynamic token, whether a result obtained by performing an AND operation on the calibration value and 0x7F is less than the calibration count value, if yes, the first parameter and the second parameter need to be calibrated; otherwise, the first parameter and the second parameter need not to be calibrated;

updating the first parameter, the second parameter and the calibration count value according to the calibration value and the calibration count value specifically including: updating the calibration count value as a value obtained by subtracting the calibration value from a current value of the calibration count value, checking the most significant digit of the calibration value, updating the first parameter by subtracting 1 from a current value of the first parameter and updating the second parameter by subtracting 1 from a current value of the second parameter if the most significant digit of the calibration value is 1; updating the first parameter by adding 1 to the current value of the first parameter and updating the second parameter by adding 1 to the current value of the second parameter if the most significant digit of the second parameter is 0.

Preferably, before whether the key-interrupt flag is set is determined, the interrupt process flow further includes: determining whether a tooling-communication-interrupt flag is set, if yes, setting a tooling-communication-waken flag, resetting the tooling-communication-interrupt flag, and the interrupt process flow is finished; otherwise determining whether the key-interrupt flag is set; in which, when communication data sent by the tooling is received by the dynamic token, the tooling-communication-interrupt is triggered, and the tooling-communication-interrupt flag is set;

Step S3 is replaced as: the dynamic token determining whether any set waken flag exists, checking the tooling-communication-waken flag and the key-waken flag successively if any set waken flag exist, entering into a tooling communication process flow in case that the tooling-communication-waken flag is set, and re-executing Step S3 when the tooling communication process flow is finished; entering into the key process flow in case that the key-waken flag is set, and re-executing Step S3 when the key process flow is finished; the dynamic token entering into a sleep mode in case that no set waken flag exists, waiting for being waken, and returning to Step S2;

the tooling communication process flow including:

Step Y1, turning off a general interrupt, determining whether data received currently is a waken signal sent by the tooling, if yes, returning a hand-shake signal to the tooling, continuing to receive communication data sent by the tooling, and executing Step Y2; otherwise, executing Step Y3;

Step Y2, determining a type of the data received currently, obtaining a random number from an obtaining-token-hardware-information command in case that the data received currently is the obtaining-token-hardware-information command, storing the random number, returning the obtained random number to the tooling, and executing Step Y3; decrypting a received tooling command according to the random number stored in the dynamic token in case that the data received currently is another tooling command, executing the decrypted command, and returning a result to the tooling, and executing Step Y3; otherwise, executing Step Y3; and Step Y3, setting the tooling communication waken flag, enabling the general interrupt, the tooling communication process flow is finished.

According the present disclosure, a user can program seed data into the dynamic token and update the seed data in the dynamic token by operating the dynamic token. In the present disclosure, the dynamic token can store and manage multiple of seeds, it is more convenient for a user because an OTP is generated by using corresponding seed data according to a choice of the user during usage of the dynamic token, and the seed data is safer and more reliable because the unique identification of the dynamic token binds with the seed data.

BRIEF DESCRIPTION OF THE ACCOMPANYING DRAWINGS

The present invention or prior art are further described more clearly and completely with the drawings of the present invention. Obviously, the embodiments herein are just a few embodiments of the present invention, and when it comes to those skilled in the art, other drawings can be obtained by them without any inventive work.

Figure 2:
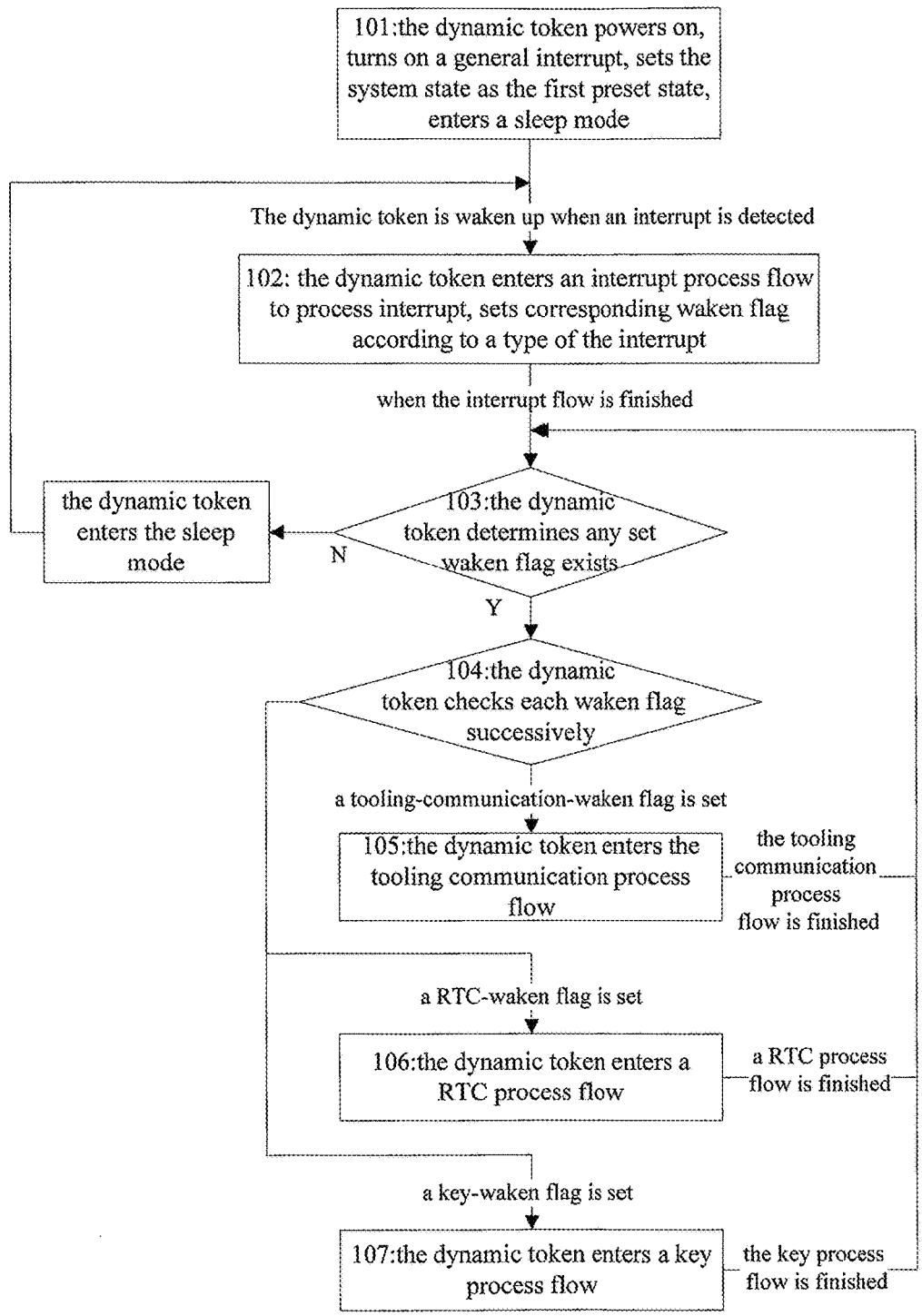
Figure 3:
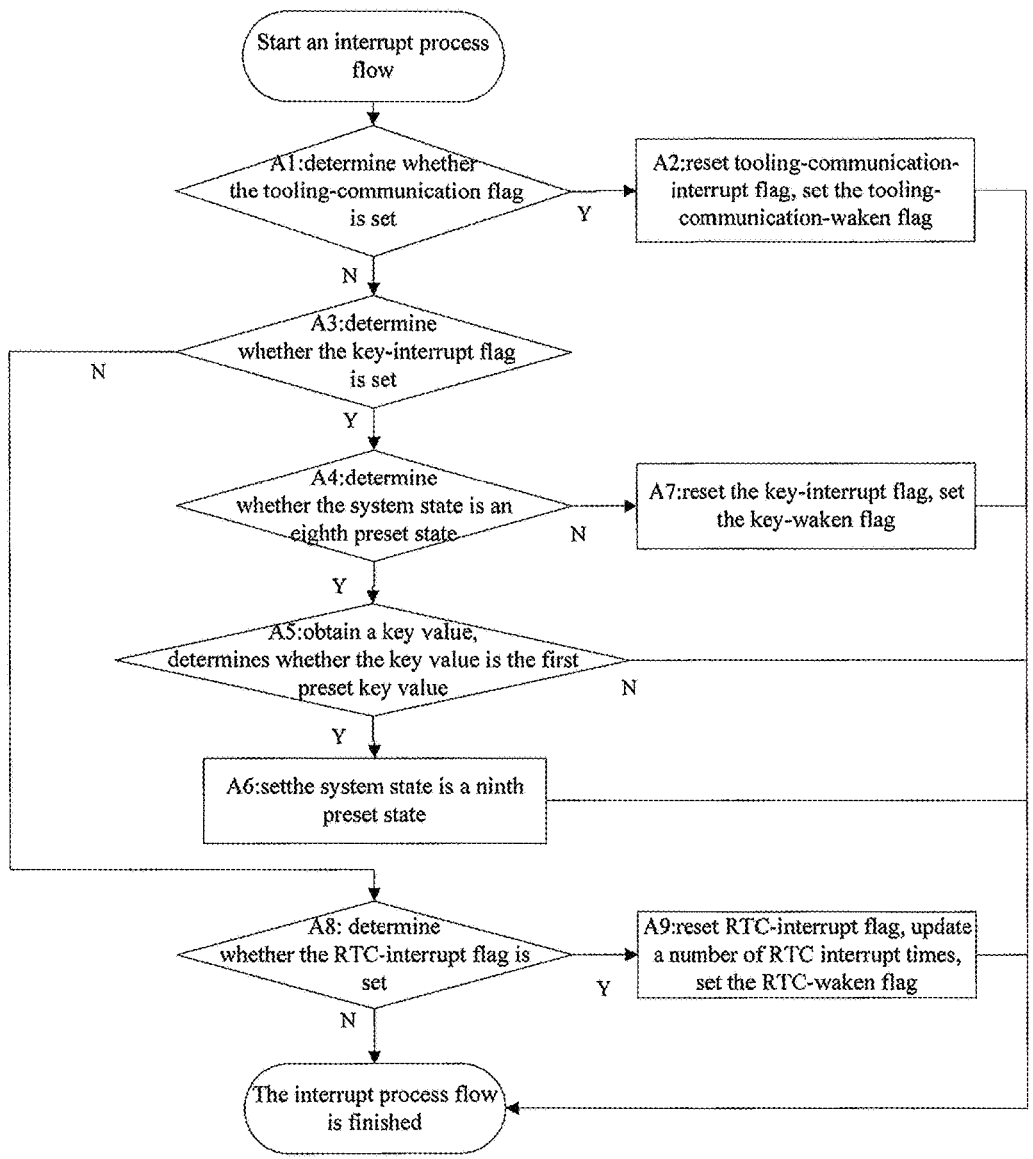
Figure 4:
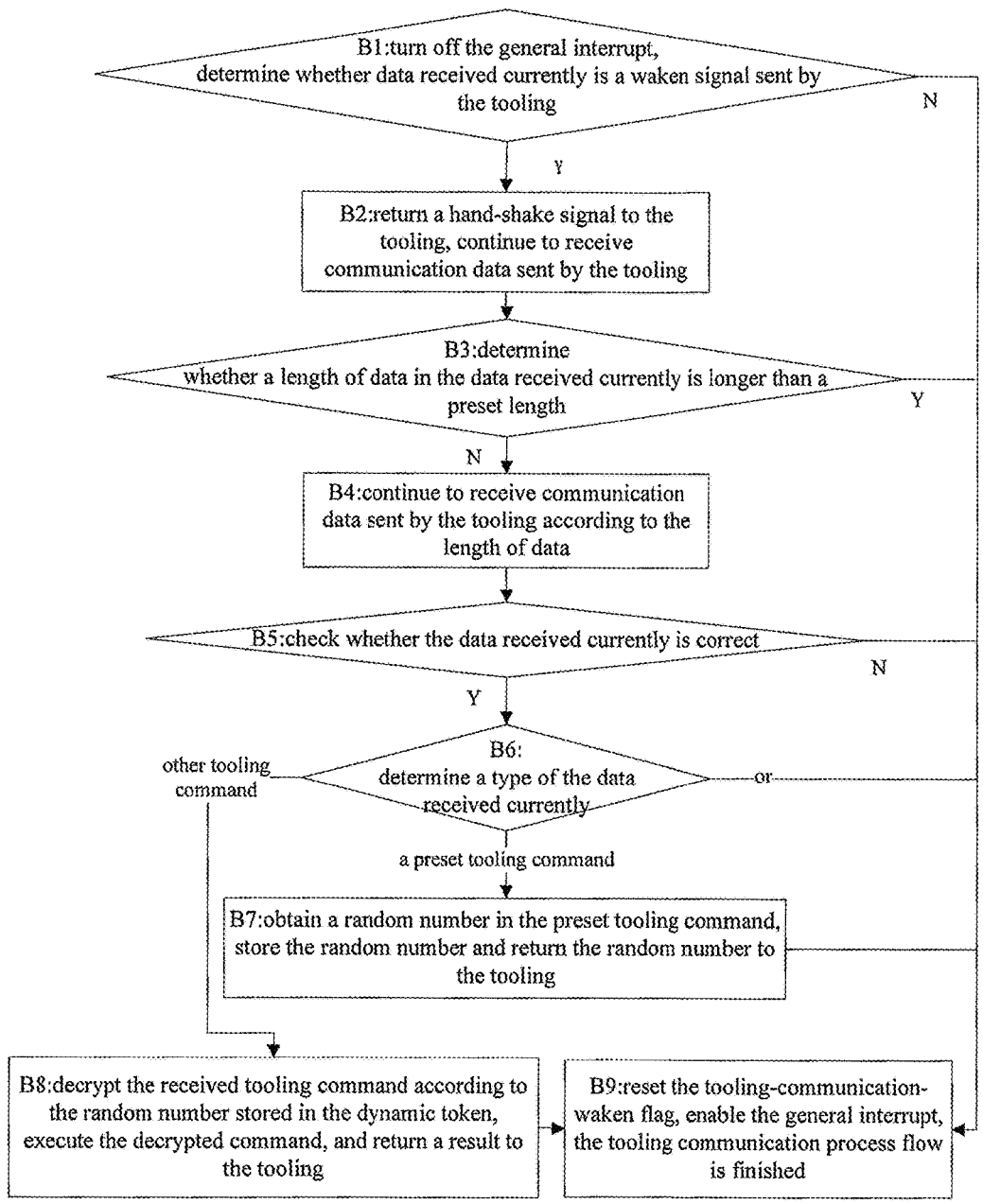
Figure 5:
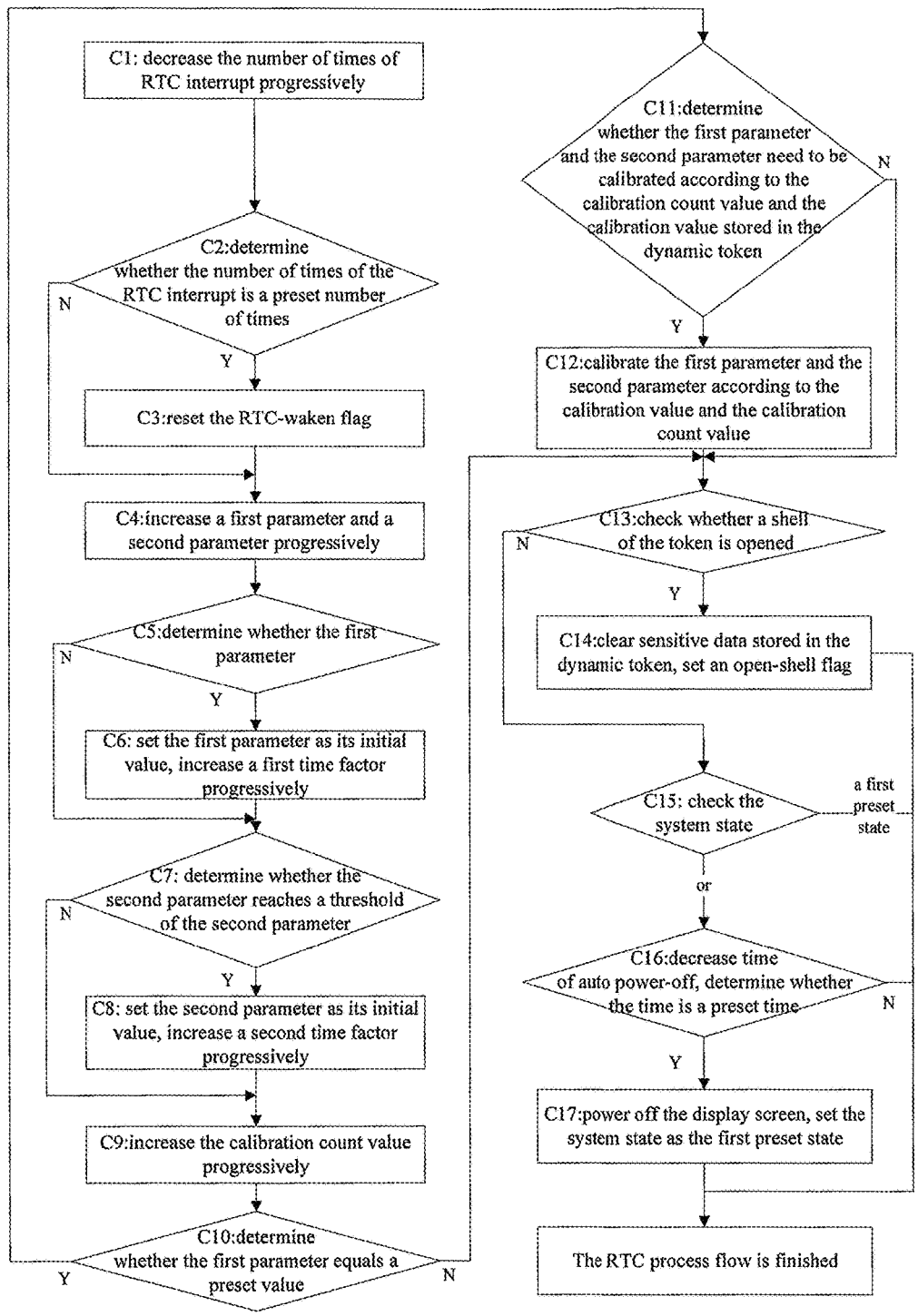
Figure 6:
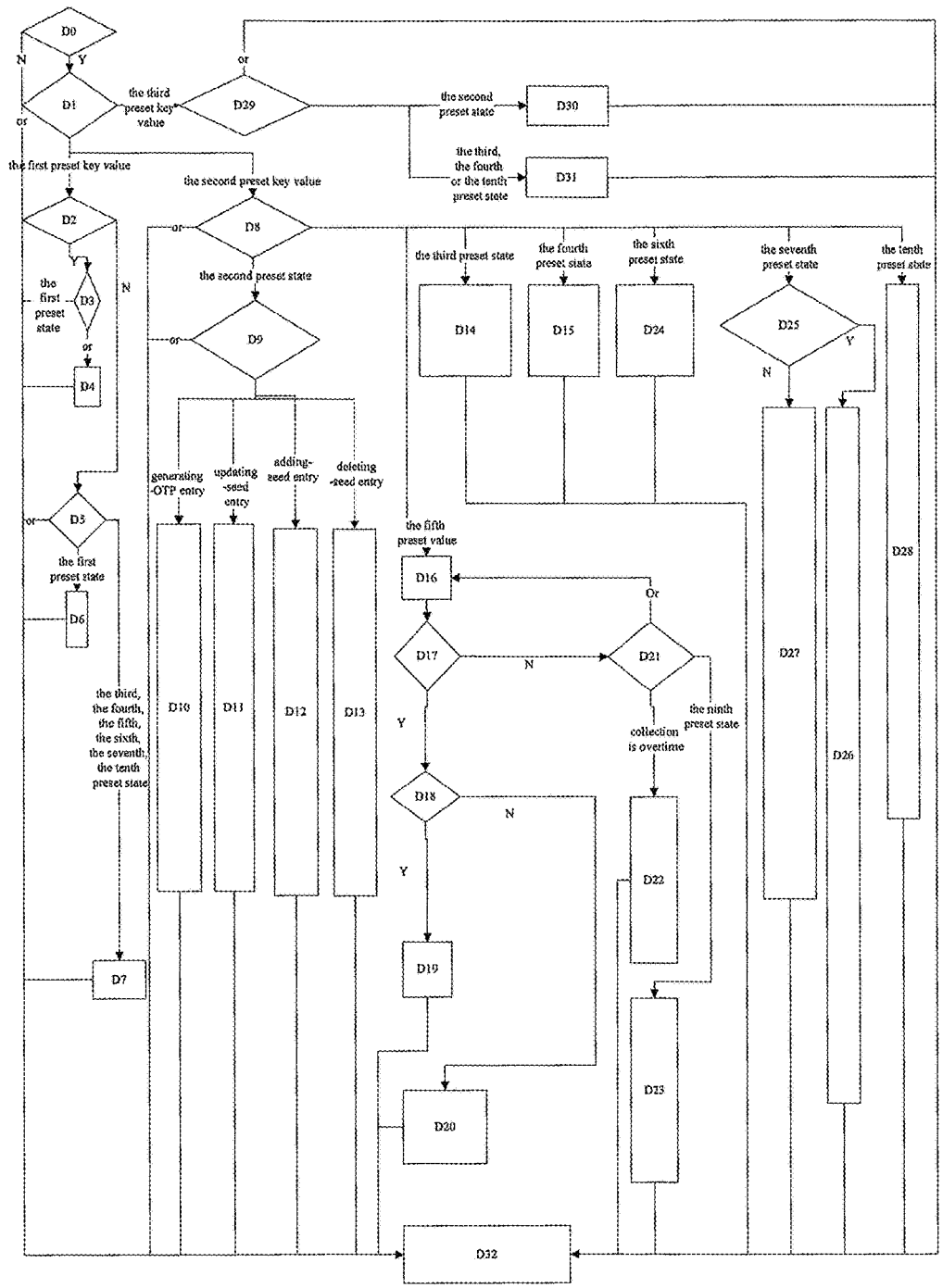

FIG. 1 provides a flow chart of processing a key in a working method of multi-seeded dynamic token according to Embodiment 1 of the present invention;

FIG. 2 provides a flow chart of a working method of multi-seeded dynamic token according to Embodiment 2 of the present invention;

FIG. 3 provides a flow chart of processing an interrupt according to Embodiment 2 of the present invention;

FIG. 4 provides a flow chart of processing a tooling communication according to Embodiment 2 of the present invention;

FIG. 5 provides a flow chart of processing a RTC according to Embodiment 2 of the present invention;

FIG. 6 provides a flow chart of processing a key according to Embodiment 2 of the present invention.

DETAILED DESCRIPTION OF THE INVENTION

The technical solution in the Embodiments of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Embodiment 1 of the present invention provides a working method of a multi-seeded dynamic token, which includes:

Step S1, a dynamic token is powered on and initialized, a general interrupt is turned on, a system state is set as a first preset state, and the dynamic token is made to enter into a sleeping mode and waits for being waken;

Step S2, the dynamic token is waken when an interrupt is detected, an interrupt process flow is entered, Step S3 is executed after the interrupt process flow is finished;

in which the interrupt process flow includes: the dynamic token determines whether a key-interrupt flag is set, if yes, a key-waken flag is set, the key-interrupt flag is reset, and the interrupt process flow is finished; otherwise, the interrupt process flow is finished; in which, a key interrupt is triggered when a key of the dynamic token is pressed, and the key-interrupt flag is set;

Step S3, the key-waken flag is checked by the dynamic token, a key process flow is entered in case that the key-waken flag is set, re-entering into a sleeping mode after the key process flow is finished, the dynamic token waits for being waken, and Step S2 is returned;

In Embodiment 1, as shown in FIG. 1, the key process flow specifically includes:

Step 11, the dynamic token obtains a key value, and determines the key value and a system state, Step 12 is executed in case that the key value is a first preset key value and the system state is a first preset state; Step 13 is executed in case that the key value is a second preset key value and the system state is a second preset state; Step 16 is executed in case that the key value is the second preset key value and the system state is a third preset state; Step 17 is executed in case that the key value is the second preset key value and the system state is a fifth preset state; Step 20 is executed in case that the key value is a third preset key value and the system state is the second preset state; Step 21 is executed in case that the key value is the third preset key value and the system state is the third preset state; otherwise, Step 22 is executed;

Step 12, the dynamic token displays a function menu, initializes a function menu index, sets the system state as the second preset state, and executes Step 22;

Step 13, the dynamic token determines an operation chosen by a user according to the function menu index, Step 14 is executed in case that the operation chosen by the user is generating an OTP; Step 15 is executed in case that the operation chosen by the user is programming seed data;

Step 14, the dynamic token displays a seed data menu, a seed menu index is initialized, the system state is set as the third preset state, and Step 22 is executed;

Step 15, a pre-stored serial number of the dynamic token is obtained and displayed by the dynamic token, the system state is set as the fifth preset state, and Step 22 is executed;

Step 16, the dynamic token reads seed data, which is stored in the dynamic token and is arranged to correspond to the seed menu index, generates an OTP according to the read seed data and displays the OTP, the system state is set as a sixth preset state, and Step 22 is executed;

Step 17, the dynamic token collects light sensor data, and determines whether a serial number in the collected light sensor data matches the pre-stored serial number of the dynamic token, if yes, Step 18 is executed; otherwise, Step 19 is executed;

Step 18, seed data in the collected light sensor data is stored by the dynamic token, an OTP is generated according to stored seed data and the OTP is displayed, the system state is set as the sixth preset state, and Step 22 is executed;

Step 19, the collected light sensor data is cleared by the dynamic token, the pre-stored serial number of the dynamic token is obtained and displayed, the system state is set as the fifth preset state, and Step 22 is executed;

Step 20, the function menu index is updated by the dynamic token, and Step 22 is executed;

Step 21, the seed menu index is updated by the dynamic token, and Step 22 is executed;

Step 22, the key-waken flag is reset by the dynamic token, and the key process flow is finished.

In the present Embodiment 1, Step 11 further includes: the dynamic token displays the function menu, initializes the function menu index, sets the system state as the second preset state, and executes Step 22 when the key value is the first preset key value and the system state is the third preset state, the fourth preset state or the sixth preset state; the system state is set as the first preset state and Step 22 is executed when the key value is a fourth preset key value and the system state is not the first preset state.

One of the first preset key value, the second preset key value, the third preset key value and the fourth preset key value corresponds one button or some of them correspond one button. The dynamic token obtains a corresponding key value via a button in case that the first preset key value, the second preset key value, the third preset key value and the fourth preset key value correspond different buttons respectively; the dynamic token obtains a corresponding key value via the button and/or a way of pressing button (such as press for a long time or for a short time) in case that some of the first preset key value, the second preset key value, the third preset key value and the fourth preset key value correspond one button.

Embodiment 2

In the key process flow in Embodiment 1, the sequence of determining the key value and determining the system state is not restricted, in another word, the object of the present invent can be realized no matter the key value is determined firstly or the system state is determined firstly; however, in Embodiment 2 of the present invention, it takes determining the key value firstly as an example, and provides a working method of a multi-seeded dynamic token, as shown in FIG. 2, the method specifically includes:

Step 101, a dynamic token is powered on and initialized, a general interrupt is turned on, a system state is set as a first preset state, the dynamic token enters into a sleeping mode, and is waken when an interrupt is detected, Step 102 is executed.

In the present Embodiment 2, the interrupt includes: a tooling communication interrupt, a RTC interrupt and a key interrupt.

Step 102, the dynamic token enters into an interrupt process flow to process an interrupt, and sets a corresponding waken flag according to a type of the interrupt, Step 103 is executed after the interrupt process flow is finished;

in the present Embodiment 2, as shown in FIG. 3, the interrupt process flow specifically comprises:

Step A1, whether a tooling-communication-interrupt flag is set is determined, if yes, Step A2 is executed; otherwise, Step A3 is executed;

Step A2, the tooling-communication-interrupt flag is reset, a tooling-communication-waken flag is set, and the interrupt process flow is finished;

Step A3, whether a key-interrupt flag is set is determined, if yes, Step A4 is executed; otherwise, Step A8 is executed;

Step A4, whether the system state is an eighth preset state is determined, if yes, Step A5 is executed; otherwise, Step A7 is executed;

Step A5, a key value is obtained, whether the key value is a first preset key value is determined, if yes, Step A6 is executed; otherwise, the interrupt process flow is finished;

Step A6, the system state is set as a ninth preset state, and the interrupt process flow is finished;

Step A7, the key-interrupt flag is reset, a key-waken flag is set, and the interrupt process flow is finished;

Step A8, whether the RTC-interrupt flag is set is determined, if yes, Step A9 is executed; otherwise, the interrupt process flow is finished;

Step A9, the RTC-interrupt flag is reset, the number of times of RTC interrupt is updated, a RTC-waken flag is set, and the interrupt process flow is finished.

In Embodiment 2, a communication interrupt is triggered when communication data sent by the tooling is received by the dynamic token, a communication-interrupt flag is set; the key interrupt is triggered when a key of the dynamic token is pressed, the key-interrupt flag is set, the RTC interrupt is triggered per second, the RTC-interrupt flag is set when the RTC interrupt is triggered.

In the interrupt process flow in Embodiment 2, the number of times of RTC interrupt is updated by adding 1 to the current number of times.

Step 103, the dynamic token determines whether any set waken flag exist, if yes, Step 104 is executed; otherwise, the dynamic token enters into the sleeping mode, and is waken when an interrupt is detected, and Step 102 is returned to;

Step 104, the dynamic token checks each waken flag successively, Step 105 is executed in case that a tooling-communication-waken flag is set; Step 106 is executed in case that the RTC-waken flag is set; Step 107 is executed in case that the key-waken flag is set;

in Embodiment 2, the waken flags include: the tooling-communication-waken flag, the RTC-waken flag and the key-waken flag, preferably, the dynamic token checks the tooling-communication-waken flag, the RTC-waken flag and the key-waken flag successively.

Step 105, the dynamic token enters into the tooling communication process flow, and Step 103 is returned to when the tooling communication process flow is finished;

in Embodiment 2, as shown in FIG. 4, the dynamic token entering into the tooling communication process flow specifically comprises:

Step B1, the general interrupt is turned off, whether data received currently is a waken signal sent by the tooling is determined, if yes, Step B2 is executed; otherwise, Step B9 is executed;

Step B2, a hand-shake signal is returned to the tooling, communication data sent by the tooling continues to be received;

Step B3, whether a data length in the data received currently is larger than a preset length is determined, if yes, Step B9 is executed; otherwise, Step B4 is executed;

in the present Embodiment 2, the preset length is 50 bytes.

Step B4, the communication data sent by the tooling continues to be received according to the data length;

Step B5, whether the data received currently is correct is checked, if yes, Step B6 is executed; otherwise, Step B9 is executed;

Step B6, a type of the data received currently is determined, Step B7 is executed in case that the data is a preset tooling command; Step B8 is executed in case that the data is other command; otherwise, Step B9 is executed;

In the present Embodiment 2, the preset tooling command is an obtaining-token-hardware-information command sent by the tooling.

Step B7, a random number in the preset tooling command is obtained, the obtained random number is saved and returned to the tooling, and Step B9 is executed;

Step B8, a received tooling command is decrypted according to the random number saved in the dynamic token, a decrypted command is executed to obtain a result, the result is returned to the tooling, and Step B9 is executed;

in the present Embodiment 2, the other tooling command comprises: writing-time-factor command; executing a decrypted writing-time-factor command specifically comprises: a time factor in the writing-time-factor command is stored, the time factor comprises: a first time factor and a second time factor.

Step B9, the tooling-communication-waken flag is reset, the general interrupt is enabled, the tooling communication process flow is finished.

Step 106, the dynamic token enters into the RTC process flow, Step 103 is returned to after the RTC process flow is finished;

in the present Embodiment 2, as shown in FIG. 5, the dynamic token entering into the RTC process flow specifically includes:

Step C1, the number of times of the RTC interrupt is decreased progressively;

in Step C1 of the present Embodiment 2, that the number of times of the RTC interrupt is decreased progressively specifically is updating the number of times of the RTC interrupt by subtracting 1 from the current number of times of the RTC interrupt;

Step C2, determine whether the number of times of the RTC interrupt is a preset number of times, if yes, Step C3 is executed; otherwise, Step C4 is executed;

in the present Embodiment 2, the preset number of times is 0.

Step C3, the RTC waken flag is reset, and Step C4 is executed;

Step C4, a first parameter and a second parameter are increased progressively;

in the present Embodiment 2, both an initial value of the first parameter and an initial value of the second parameter are 0; increasing the first parameter and the second parameter progressively specifically is updating the first parameter by adding 1 to the current value of the first parameter, and updating the second parameter by adding 1 to the current value of the second parameter;

Step C5, determine whether the first parameter reaches a threshold of the first parameter, if yes, Step C6 is executed; otherwise, Step C7 is executed;

in the present Embodiment 2, the threshold of the first parameter is 30.

Step C6, the first parameter is set as the initial value of the first parameter, the first time factor is increased progressively, and Step C7 is executed;

in the present Embodiment 2, increasing the first time factor progressively specifically is updating the first time factor by adding 1 to the current value of the first time factor;

Step C7, determine whether the second parameter reaches a threshold of the second parameter, if yes, Step C8 is executed; otherwise, Step C9 is executed;

in the present Embodiment 2, the threshold of the second parameter is 60.

Step C8, the second parameter is set as the initial value of the second parameter, the second time factor is increased progressively, and Step C9 is executed;

in the present Embodiment 2, increasing the second time factor specifically is updating the second time factor by adding 1 to the current value of second time factor;

Step C9, a calibration count value is increased progressively;

in Embodiment 2, increasing the calibration count value progressively specifically is updating the calibration count value by adding 1 to the current value of the calibration count value;

Step C10, determine whether the first parameter equals a preset value, if yes, Step C11 is executed; otherwise, Step 13 is executed;

in the present Embodiment 2, the preset value is 15;

Step C11, determine whether the first parameter and the second parameter need to be calibrated according to the calibration count value and calibration value stored in the dynamic token, if yes, Step C12 is executed; otherwise, Step C13 is executed;

in Embodiment 2, Step C11 specifically comprises: whether the calibration value &0x7F is less than the calibration count value is determined, if yes, the first parameter and the second parameter need to be calibrated, and Step C12 is executed; otherwise, the first parameter and the second parameter do not need to be calibrated, and Step C13 is executed.

Step C12, the first parameter and the second parameter are calibrated according to the calibration value and the calibration count value, the calibration count value is calibrated, and Step C13 is executed;

in the present Embodiment 2, the calibration count value is updated by subtracting the calibration value from the current value of the calibration count value, the most important digit of the calibration value is checked, the first parameter is calibrated by subtracting 1 from the current value of the first parameter and the second parameter is calibrated by subtracting 1 from the current value of the second parameter in case that the most important digit of the calibration value is 1; the first parameter is calibrated by adding 1 to the current value of the first parameter and the second parameter is calibrated by adding 1 to the current value of the second parameter in case that the most important digit of the calibration value is 0.

Step C13, check whether a shell of the token is opened, if yes, Step C14 is executed; otherwise, Step C15 is executed;

Step C14, sensitive data stored in the token is cleared, an open-shell flag is set, and the RTC process flow is finished;

Step C15, the system state is checked, the RTC process flow is finished in case that the system state is the first preset state; otherwise, Step C16 is executed;

Step C16, time of auto power-off is decreased progressively, whether the time of auto power-off is a preset time is determined, if yes, Step C17 is executed; otherwise, the RTC process flow is finished;

in the present Embodiment 2, decreasing the time of auto power-off progressively specifically is: the time of auto power-off is updated by subtracting 1 from the current value of the time of auto power-off, the preset time is 0;

Step C17, a display screen is powered off, the system state is set as the first preset state, and the RTC process flow is finished.

in the Embodiment 2, the sensitive data is the data which needs to be protected from being obtained illegally, and the sensitive data includes all of the seed data.

Step 107, the dynamic token enters into the key process flow, and Step 103 is returned to after the key process flow is finished in the present Embodiment 2, as shown in FIG. 6, the dynamic token entering into the key process flow specifically includes:

Step D0, a key value is obtained, whether the key value is valid is determined, if yes, Step D1 is executed; otherwise, Step D32 is executed;

Step D1, the time of auto power-off is reset, the key value is checked, Step D2 is executed in case that the key value is the first preset key value; Step D8 is executed in case that the key value is the second preset key value; Step D29 is executed in case that the key value is the third preset key value; otherwise, Step D32 is executed;

Step D2, the duration for pressing the key is calculated, whether the duration for pressing the key is a preset duration is determined, if yes, Step D3 is executed; otherwise, Step D5 is executed;

specifically, Step D2 includes:

Step i, a count value of a timer is initialized, the timer is turned on to begin timing;

in the present Embodiment 2, the count value of the time is initialized as 0;

Step ii, determine whether the count value of the timer reaches a preset duration, if yes, the duration for pressing the key is longer than the preset duration, the timer is turned off, and Step D3 is executed; otherwise, Step iii is executed;

in the present Embodiment 2, the preset duration is 1 second;

Step iii, determine whether a state of the key is being pressed, if yes, Step ii is returned to; otherwise, the duration for pressing the key is not longer than the preset duration, the timer is turned off, and Step D5 is executed.

Step D3, the system state is checked, Step D32 is executed in case that the system state is the first preset state; otherwise, Step D4 is executed;

Step D4, the display screen is powered off, the system state is set as the first preset state, and Step D32 is executed;

Step D5, the system state is checked, Step D6 is executed if the system state is the first preset state; Step D7 is executed in case that the system state is a third preset state, a fourth preset state, a fifth preset state, a sixth preset state, a seventh preset state or a tenth preset state; otherwise, Step D32 is executed;

Step D6, the display screen is powered on, the system state is set as the second preset state, the function menu index is initialized, the function menu is written into a display buffer, a chosen function entry is identified according to the function menu index, and Step D32 is executed;

Step D7, the system state is set as the second preset state, the function menu index is initialized, the function menu is written into the display buffer, the chosen function entry is identified according to the function menu index, and Step D32 is executed;

in the present Embodiment 2, the function menu comprises: generating-OTP entry, updating-seed entry and adding-seed entry.

Step D8, the system state is checked, Step D9 is executed in case that the system state is the second preset state; Step D14 is executed in case that the system state is the third preset state; Step D15 is executed in case that the system state is the fourth preset state; Step D16 is executed in case that the system state is the fifth preset state; Step D24 is executed in case that the system state is the sixth preset state; Step D25 is executed in case that the system state is the seventh preset state; Step D28 is executed in case that the system state is the tenth preset state; otherwise, Step D32 is executed;

Step D9, determine the chosen function entry according to the function menu index, Step D10 is executed in case that the chosen function entry is a generating-OTP entry; Step D11 is executed in case that the chosen function entry is an updating-seed entry; Step D12 is executed in case that the chosen function entry is an adding-seed entry; Step D13 is executed in case that the chosen function entry is a deleting-seed entry; otherwise, Step D32 is executed;

Step D10, the system state is set as the third preset state, a seed menu index is initialized, a seed menu is written into the display buffer, a chosen seed entry is identified according to the seed menu index, and Step D32 is executed;

preferably, in the present Embodiment 2, the seed menu includes application information corresponding to each seed data stored in the dynamic token.

Step D11, the system state is set as the fourth preset state, the seed menu index is initialized, the seed menu is written into the display buffer, the chosen seed entry is identified according to the seed menu index, and Step D32 is executed;

Step D12, a serial number pre-stored in the dynamic token is written into the display buffer, the system state is set as the fifth preset state, an adding-seed-data flag is set, and Step D32 is executed;

Step D13, the system state is set as the tenth preset state, the seed menu index is initialized, the seed menu is written into the display buffer, and the chosen seed entry is identified according to the seed menu index, Step D32 is executed;

Step D14, corresponding seed data stored in the dynamic token is looked up according to the seed menu index, an OTP is generated according to the seed data and a dynamic factor stored in the dynamic token, the generated OTP is written into the display buffer, the system state is set as the sixth preset state, and Step D32 is executed;

Step D15, the serial number pre-stored in the dynamic token is written into the display buffer, the system state is set as the fifth preset state, the adding-seed-data flag is reset, and Step D32 is executed;

Step D16, the system state is set as the eighth preset state, and Step D17 is executed;

Step D17, light sensor data is collected, that the light sensor data is being collected is prompted, whether all light sensor data is collected is determined, if yes, Step D18 is executed; otherwise, Step D21 is executed;

Step D18, determine whether a serial number in the collected light sensor data matches the serial number pre-stored in the dynamic token, if yes, Step D19 is executed; otherwise, Step D20 is executed;

in the present Embodiment 2, Step D18 specifically is: determining whether the serial number in the collected light sensor data is as same as the serial number pre-stored in the dynamic token, if yes, Step D19 is executed; otherwise, Step D20 is executed.

Step D19, the system state is set as the seventh preset state, application information in the collected light sensor data is written into the display buffer, a user is prompted to confirm, and Step D32 is executed;

Step D20, the collected light sensor data is cleared, that the seed data is programmed falsely is prompted, the serial number pre-stored in the dynamic token is written into the display buffer, the system state is set as the fifth preset state, and Step D32 is executed;

Step D21, determine whether the collection is overtime, or determine whether the system state is the ninth preset state; Step D22 is execute in case that the collection is overtime; Step D23 is executed in case that the system state is the ninth preset state; otherwise, Step D16 is executed;

Step D22, clear the collected light sensor data, prompt that the seed data is programmed overtime, the serial number pre-stored in the dynamic token is written into the display buffer, the system state is set as the fifth preset state, and Step D32 is executed;

Step D23, clear the collected light sensor data, prompt that programming the seed data is canceled, the serial number pre-stored in the dynamic token is written into the display buffer, the system state is set as the fifth preset state, Step D32 is executed;

Step D24, the system state is set as the second preset state, the function menu index is initialized, the function menu is written into the display buffer, the chosen function entry is identified according to the function menu index, and Step D32 is executed;

Step D25, determine whether the adding-seed-data flag is set, if yes, Step D26 is executed; otherwise, Step D27 is executed;

Step D26, the seed data in the collected light sensor data is stored, the application information in the collected light sensor data is added into the seed menu, an OTP is generated according to latest stored seed data and the dynamic factor stored in the dynamic token, and the OTP is written into the display buffer, the system state is set as the sixth preset state, and Step D32 is executed;

Furthermore, Step D26 includes: the number of seeds is decreased progressively; correspondingly, in the present Embodiment 2, the number of seeds before the function menu is written into an output buffer, all of the function menu but adding seed entry is written into the output buffer in case that the number of seeds reaches a max number; all of the function menu is written into the output buffer in case that the number of seeds does not reach the max number.

Step D27, the seed data corresponding to the seed menu index is replaced with the seed data in the collected light sensor data, an OTP is generated according to the latest stored seed data and the dynamic factor stored in the dynamic token, and the generated OTP is written into the display buffer, the system state is set as the sixth preset state, and Step D32 is executed;

Step D28, the application information and the seed data corresponding to the seed menu index are deleted, the system state is set as the second preset state, the function menu index is initialized, the function menu is written into the display buffer, the chosen function entry is identified according to the function menu index, and Step D32 is executed;

Further, Step D28 includes: the number of seeds is decreased progressively.

Step D29, the system state is checked, Step D30 is executed in case that the system state is the second preset state; Step D31 is executed in case that the system state is the third preset state, the fourth preset state or the tenth preset state; otherwise, Step D32 is executed;

Step D30, the function menu index is updated, the chosen function entry is re-identified according to the updated function menu index, and Step D32 is executed;

Step D31, the seed menu index is updated, the chosen seed entry is re-identified according to the updated seed menu index, and Step D32 is executed;

Step D32, the key-waken flag is reset, the key process flow is finished.

Furthermore, in the present Embodiment 2:

the light sensor data further includes an expiry date of the seed data, correspondingly:

Step C9 in the RTC process flow further comprises: determine whether each seed data expires according to the expiry date of each seed data stored in the dynamic token, if yes, a corresponding seed-data-invalid flag is set, and Step C9 is executed; otherwise, the expiry date of each seed data stored in the dynamic token is updated, and Step C9 is executed; specifically, determine whether each seed data expires by determining whether the expiry date of each seed data stored in the dynamic token is 0, if yes, the seed data expires; if no, the seed data does not expire; the expiry date of the seed data which does not expire is updated by subtracting 1 from the current value of the expiry date;

In Step D14, in the key process flow, after the seed data is found, the step further includes: whether seed-data-invalid flag corresponding to the seed data is set is checked, if yes, prompt that the seed data is invalid, and Step D32 is executed; otherwise, an OTP is generated according to the found seed data and the dynamic factor stored in the dynamic token; Step D26 further includes: the expiry date of the seed data in the collected light sensor data is stored; Step D27 further includes: the expiry date of the seed data which corresponds to the seed menu index is replaced with the expiry date of the seed date in the collected light sensor data;

The light sensor data further includes display precision, correspondingly:

Step D26 in the key process flow further includes a display precision of the OTP in the collected light sensor data is stored; Step D27 further includes: the display precision of the OTP of the seed data corresponding to the seed menu index is replaced with the display precision of the OTP in the collected light sensor data; that the generated OTP is written into the display buffer in Step D14, Step D26 and Step D27 can be replaced as: intercepting the generated OTP according to the corresponding display precision of the OTP, and writing an intercepted data into the display buffer;

for example, the display precision of the OTP corresponding to the seed data, according to which an OTP is generated, is 6, the last six digits of the generated OTP is subtracted and written into the display buffer;

the light sensor data may further includes mode information of the dynamic token, in which, the mode information of the dynamic token includes: an event mode, a first time mode and a second time mode, correspondingly:

in Step D26 of the key process flow, before the OTP is generated, the step further includes: the mode information of the dynamic token in the collected light sensor data is stored, an event factor corresponding to the seed data is set in case that the mode information of the dynamic token is an event mode; Step D27 further includes: the mode information of the dynamic token of the seed data which corresponds to the seed menu index is replaced with the mode information of the dynamic token in the collected light sensor data, the step further includes the event factor corresponding to the seed data which corresponds to the seed menu index is reset in case that the mode information of the dynamic token in the collected light sensor data is an event mode; generating an OTP according to the found seed data and the dynamic factor stored in the dynamic token in Step D14 specifically includes: mode information of the dynamic token corresponding to the found seed data and the dynamic factor, both of which are stored in the dynamic token, are read, the event factor, stored in the dynamic token, which corresponds to the found seed data is read in case that the mode information is the event mode, and an OTP is generated according to the found seed data and the read event factor; a first time factor stored in the dynamic token is read in case that the mode information id the first time mode, and an OTP is generated according to the found seed data and the read first time factor; the second time factor stored in the dynamic token is read in case that the mode information is the second time mode, and an OTP is generated according to the found seed data and the read second time factor; in which, in case that the OTP is generated according to the found seed data and the read event factor, before or after the OTP is generated, the step further includes: the event factor, stored in the dynamic token, which corresponds to the found seed data is updated; generating an OTP according to the latest seed data and the dynamic token stored in the dynamic token in Step D26 and Step D27 specifically includes: the mode information of the dynamic token corresponding to the latest stored seed data is checked, an OTP is generated according to the latest stored seed data and the event factor in case that the mode information of the dynamic token is the event mode; an OTP is generated according to the latest stored seed data and the first time factor in case that the mode information of the dynamic token is the first time mode; an OTP is generated according to the latest stored seed data and the second time factor in case that the mode information of the dynamic token is the second time mode; in which, when the OTP is generated according to the latest stored seed data and the event factor and the event factor, before or after the OTP is generated, the step further includes: the event factor stored in the dynamic token is updated.

Embodiments described herein are just a few preferable Embodiments of the present invention. On the basis of Embodiments of the invention, all other related Embodiments made by those skilled in the art without any inventive work belong to the scope of the invention.

The invention claimed is:

1. A working method of multi-seeded dynamic token, wherein said method comprises the steps of:
Step S1, powering on and initializing a dynamic token, turning on a general interrupt, setting a system state as a first preset state, making the dynamic token enter into a sleep mode, and the dynamic token waiting for being waken;
Step S2, waking up the dynamic token when an interrupt is detected, making the dynamic token enter into an interrupt process flow, and executing Step S3 after the interrupt process flow is finished; in which the interrupt process flow includes: determining, by the dynamic token, whether a key-interrupt flag is set, if yes, setting a button-waken flag and resetting the key-interrupt flag, and ending the interrupt process flow; otherwise, ending the interrupt process flow; a key interrupt is triggered when a key on the dynamic token is pressed, and the key-interrupt flag is set;
Step S3, checking, by the dynamic token, the button-waken flag, entering into the key process flow in case that the button-waken flag is set, reentering into the sleep mode when the key process flow is finished, waiting for being waken, and returning to Step S2;
in which the key process flow comprises:
Step a, obtaining, by the dynamic token, a key value, determining the key value and the system state, executing Step b in case that the key value is a first preset key value and the system state is a first preset state; executing Step c in case that the key value is a second preset key value and the system state is a second preset state; executing Step d in case that the key value is the second preset key value and the system state is a third preset state; executing Step e in case that the key value is the second preset key value and the system state is a fifth preset state; executing Step f in case that the key value is a third preset key value and the system state is the second preset state; executing Step g in case that the key value is the third preset key value and the system state is the third preset state; otherwise, executing Step h;
Step b, displaying, by the dynamic token, a function menu, initializing a function menu index, setting the system state as the second preset state, and executing Step h;
Step c, determining, by the dynamic token, an operation chosen by a user according to the function menu index, displaying a seed data menu, initializing a seed menu index, setting the system state as the third preset state and executing Step h in case that the operation chosen by the user is generating an OTP; obtaining and displaying a pre-stored serial number of the dynamic token, setting the system state as the fifth preset state and executing Step h in case that the operation chosen by the user is programming seed data;
Step d, reading, by the dynamic token, seed data, which is stored in the dynamic token and is arranged to correspond to the seed menu index, generating and displaying an OTP according to the read seed data, setting the system state as a sixth preset state, and executing Step h;
Step e, collecting, by the dynamic token, light sensor data, determining whether a serial number in the collected light sensor data matches the pre-stored serial number of the dynamic token, if yes, storing seed data which is in the collected light sensor data, and generating and displaying an OTP according to the latest stored seed data, setting the system state as the sixth preset state, and executing Step h; otherwise, clearing the collected light sensor data, obtaining and displaying the pre-stored serial number of the dynamic token, setting the system state as the fifth preset state, and executing Step h;
Step f, updating, by the dynamic token, the function menu index, and executing Step h;
Step g, updating, by the dynamic token, the seed menu index, and executing Step h; and Step h, resetting, by the dynamic token, the button-waken flag, and ending the key process flow.

2. The method as claimed in claim 1, wherein, Step c further comprises: displaying, by the dynamic token, the seed data menu, initializing the seed menu index, setting the system state as a fourth preset state, and executing Step h in case that the operation chosen by the user is to update seed data;
   Step c further comprises: setting an add-seed-data flag in case that the operation chosen by the user is to program seed data;
   Step a further comprises: obtaining and displaying, by the dynamic token, the pre-stored serial number of the dynamic token, setting the system state as the fifth preset state, resetting the add-seed-data flag, and executing Step h in case that the key value is the second preset key value and the system state is the fourth preset state; updating the seed menu index, and executing Step h in case that the key value is the third preset key value and the system state is the fourth preset state;
   storing the seed data in the collected light sensor data in Step e specifically comprises: checking the add-seed-data flag, storing the seed data in the collected light sensor data if the add-seed-data flag is set; replacing the seed data corresponding to the seed menu index with the seed data in the collected light sensor data.

3. The method as claimed in claim 1, wherein, Step c further comprises: displaying the seed data menu, initializing the seed menu index, setting the system state as a tenth preset state and executing Step h in case that the operation chosen by the user is to delete seed data;
   Step a further comprises: deleting, by the dynamic token, the seed data corresponding to the seed menu index, displaying the function menu, initializing the function menu index, setting the system state as the second preset state and executing Step h in case that the key value is the second preset key value and the system state is the tenth preset sate; updating the seed menu index and executing Step h in case that the key value is the third preset key value and the system state is the tenth preset state.

4. The method as claimed in claim 1, wherein, Step e is substituted as: collecting, by the dynamic token, the light sensor data, determining whether the serial number in the collected light sensor data matches the pre-stored serial number of the dynamic token, if yes, displaying application information in the collected light sensor data, setting the system state as a seventh preset state, and executing Step h; if no, clearing the collected light sensor data, obtaining and displaying the pre-stored serial number of the dynamic token, setting the system state as the fifth preset state, and executing Step h;
   Step a further comprises: storing, by the dynamic token, the seed data in the collected light sensor data, generating and display an OTP according to the seed data, setting the system state as a sixth preset state, and executing Step h in case that the key value is the second preset key value and the system state is the seventh preset state.

5. The method as claimed in claim 1, wherein, after the light sensor data is collected, and before whether the serial number in the collected light sensor data matches the pre-stored serial number of the dynamic token is determined, Step e further comprises: determining whether the collection is finished, if yes, determining whether the serial number in the collected light sensor data matches the pre-stored serial number of the dynamic token; if no, determining whether the collection is overtime, stopping collecting the light sensor data, prompting that the seed data is programmed overtime, obtaining and displaying the pre-stored serial number of the dynamic token, setting the system state as the fifth preset state, and executing Step h in case that the collection is overtime; continuing to collect the light sensor data in case that the collection is not overtime.

6. The method as claimed in claim 1, wherein, before the light sensor data is collected, Step e further comprises: setting the system state as an eighth preset state; after the light sensor data is collected, and before whether the serial number in the collected light sensor data matches the pre-stored serial number of the dynamic token is determined, the step e further comprises: determining whether the collection is finished, if yes, determining whether the serial number in the collected light sensor data matches the pre-stored serial number of the dynamic token; otherwise, determining whether the system state is a ninth preset state, stopping collecting the light sensor data, prompting that programming seed data is canceled, obtaining and displaying the pre-stored serial number of the dynamic token, setting the system state as the fifth preset state, and executing Step h in case that the system state is the ninth preset state; continuing to collect light sensor data in case that the system state is not the ninth preset state;
   in case that the key flag is set, before the button-waken flag is set, the interrupt process flow further comprises: determining the system state, obtaining and determining the key value in case that the system state is the eighth preset state, setting the system state as the ninth preset state and ending the interrupt process flow in case that the key value is the first preset key value; ending the interrupt process flow in case that the key value is not the first preset key value; and setting the button-waken flag in case that the system state is not the eighth preset state.

7. The method as claimed in claim 1, wherein Step a further comprises: displaying the function menu, initializing the function menu index, setting the system state as the second preset state and executing Step h in case that the key value is the first preset key value and the system state is the third preset state, the fourth preset state or the sixth preset state; setting the system state as the first preset state and executing Step h in case that the key value is the fourth preset key value and the system state is not the first preset state.

8. The method as claimed in claim 1, wherein after the seed data in the collected light sensor data is stored, and before an OTP is generated and displayed according to the stored seed data, the step e further comprises: obtaining display precision of the OTP from the collected light sensor data, and storing the obtained display precision with the obtained seed data correspondingly;
   generating and displaying an OTP according to the latest stored seed data in Step e specifically comprises: generating an OTP according to the latest stored seed data, intercepting the OTP according to the latest stored display precision of the OTP, and displaying the intercepted data;
   generating and displaying an OTP according to the read seed data in Step d specifically comprises: generating the OTP according to the read seed data, intercepting the generated OTP according to the display precision of the OTP, which is stored in the dynamic token and is arranged to correspond to the read seed data, and displaying the intercepted data.

9. The method as claimed in claim 1, wherein in case that the key-interrupt flag is not set in the interrupt process flow, the flow further comprises: determining whether a RTC-interrupt flag is set, if yes, setting a RTC-waken flag, resetting the RTC-interrupt flag, and ending the interrupt process flow; otherwise, ending the interrupt process flow; in which, when the RTC interrupt is triggered, the RTC-interrupt flag is set;

Step S3 is replaced as: determining, by the dynamic token, whether any set waken flag exists, if yes, checking the RTC-waken flag and the button-waken flag successively, entering into the key process flow in case that the button-waken flag is set, and executing Step S3 when the key process flow is finished; entering into the RTC process flow in case that the RTC-waken flag is set, and executing Step S3 when the RTC process flow is finished; if no, making the dynamic token enter into the sleep mode and waiting for being waken, and executing Step S2;

in which the RTC process flow comprises:

Step X1, decreasing, by the dynamic token, the number of RTC interrupt times progressively, determining whether the number of RTC interrupt times is a preset number of times, if yes, resetting the RTC-waken flag, and executing Step X2; otherwise, executing Step X2;

Step X2, increasing, by the dynamic token, a first parameter and a second parameter progressively, determining respectively whether the first parameter reaches a threshold of the first parameter and the second parameter reaches a threshold of the second parameter; setting the first parameter as its initial value and updating a first time factor stored in the dynamic token in case that the first parameter reaches its threshold; setting the second parameter as its initial value, updating a second time factor stored in the dynamic token and executing Step X3 in case that the second parameter reaches its threshold; executing Step X3 directly in case that neither the first parameter nor the second parameter reaches a corresponding threshold;

Step X3, updating, by the dynamic token, a calibration count value, and determining whether the first parameter equals a preset value, if yes, executing Step X4; otherwise, ending the RTC process flow; and Step X4, determining, by the dynamic token, whether the first parameter and the second parameter need to be calibrated according to the calibration count value and a calibration value pre-stored in the dynamic token, if yes, updating the first parameter, the second parameter and the calibration count value according to the calibration value and the calibration count value, ending the RTC process flow; otherwise, ending the RTC process flow.

10. The method as claimed in claim 9, wherein, after the seed data in the collected light sensor data is stored, and before the OTP is generated and displayed according to the latest stored seed data, Step e further comprises: obtaining mode information of the dynamic token from the collected light sensor data, storing the obtained mode information of the dynamic token with the obtained seed data correspondingly, and setting an event factor corresponding to the obtained seed data in case that the obtained mode information of the dynamic token is an event mode; storing the obtained mode information of the dynamic token with the obtained seed data correspondingly in case that the mode information of the dynamic token is a first time mode or a second time mode;

generating the OTP according to the latest stored seed data in Step e specifically comprises: checking the latest stored mode information of the dynamic token, generating an OTP according to the latest stored seed data and the latest set event factor if the mode information of the dynamic token is the event mode; generating an OTP according to the latest stored seed data and the first time factor in the dynamic token if the mode information of the dynamic token is the first time mode; and generating an OTP according to the latest stored seed data and the second time factor in the dynamic token if the mode information is the second time mode;

generating the OTP according to the read seed data in Step d specifically comprises: checking the mode information of the dynamic token, which is stored in the dynamic token and is arranged to correspond to the read seed data, generating an OTP according to the read seed data and an event factor, which is stored in the dynamic token and is arranged to correspond to the read seed data if the mode information of the dynamic token is an event mode; generating an OTP according to the read seed data and the first time factor in the dynamic token if the mode information of the dynamic token is the first time mode; and generating an OTP according to the read seed data and the second time factor in the dynamic token if the mode information of the dynamic token is the second time mode.

11. The method as claimed in claim 10, wherein, before or after generating an OTP according to the latest stored seed data and the latest set event factor, the method further comprises: updating the latest set event factor;

before or after generating an OTP according to the read seed data and the event factor, which is stored in the dynamic token and is arranged to correspond to the read seed data, the method further comprises: updating the event factor corresponding to the read seed data.

12. The method as claimed in claim 9, wherein the RTC process flow further comprises: checking whether a shell of the dynamic token is opened, clearing sensitive data stored inside the dynamic token and setting a shell-open flag when the shell of dynamic token being opened is checked; in which, the sensitive data comprises seed data;

before the function menu is displayed, Step b further comprises: checking whether the shell-open flag is set, if yes, prompting that the dynamic token has destroyed itself and executing Step h; otherwise, displaying the function menu.

13. The method as claimed in claim 9, wherein when the first parameter and the second parameter do not need to be calibrated, or after the first parameter, the second parameter and the calibration count value are updated according to the calibration value and the calibration count value, the Step X4 further comprises: checking the system state, ending the RTC process flow if the system state is the first preset state; decreasing time of auto power-off progressively if the system state is not the first preset state, and if the time of auto power-off equals a preset time, powering off the display screen, setting the system state as the first preset state, and ending the RTC process flow; if the time of auto power-off does not equal the preset time, ending the RTC process flow;

before Step a, the key process flow further comprises: resetting the time of auto power-off.

14. The method as claimed in claim 9, wherein after the seed data in the collected light sensor data is stored, and before the OTP is generated according to the latest stored seed data and is displayed, the Step e further comprises:

obtaining an expiry date of the seed data from the collected light sensor data, and storing the obtained expiry date of the seed data with the obtained seed data correspondingly;

when the second parameter reaches the threshold of the second parameter, the Step X2 further comprises: checking whether every seed data expires according to the expiry date of each seed data, stored in the dynamic token and arranged to correspond to each seed data, updating the expiry date of seed data corresponding to the seed data which does not expire, setting an invalidation flag of the seed data corresponding to a due seed data;

before the OTP is generated according to the read seed data, Step d further comprises: checking whether the invalidation flag of the seed data corresponding to the read seed data is set, if yes, prompting that the seed data expires and executing Step h; otherwise, generating the OTP according to the read seed data.

15. The method as claimed in claim 9, wherein determining, by the dynamic token, whether the first parameter and the second parameter need to be calibrated according to the calibration count value and the calibration value pre-stored in the dynamic token specifically comprises: determining, by the dynamic token, whether a result obtained by performing an AND operation on the calibration value and 0x7F is less than the calibration count value, if yes, the first parameter and the second parameter need to be calibrated; otherwise, the first parameter and the second parameter do not need to be calibrated.

16. The method as claimed in claim 15, wherein updating the first parameter, the second parameter and the calibration count value according to the calibration value and the calibration count value specifically comprises: updating the calibration count value as a value obtained by subtracting the calibration value from a current value of the calibration count value, checking the most significant digit of the calibration value, updating the first parameter by subtracting 1 from a current value of the first parameter and updating the second parameter by subtracting 1 from a current value of the second parameter in case that the most significant digit of the calibration value is 1; updating the first parameter by adding 1 to the current value of the first parameter and updating the second parameter by adding 1 to the current value of the second parameter in case that the most significant digit of the second parameter is 0.

17. The method as claimed in claim 1, wherein before determining whether the key-interrupt flag is set, the interrupt process flow further comprises: determining whether a tooling-communication-interrupt flag is set, if yes, setting a tooling-communication-waken flag, resetting the tooling-communication-interrupt flag, and ending the interrupt process flow; otherwise determining whether the key-interrupt flag is set; in which, when communication data sent by the tooling is received by the dynamic token, the tooling-communication-interrupt is triggered, and the tooling-communication-interrupt flag is set;

Step S3 is replaced as: determining, by the dynamic token, whether any set waken flag exists, checking the tooling-communication-waken flag and the button-waken flag successively if any set waken flag exists, entering into a tooling communication process flow in case that the tooling- communication-waken flag is set, and re-executing Step S3 when the tooling communication process flow is finished; entering into the key process flow in case that the button-waken flag is set, and re-executing Step S3 when the key process flow is finished; making the dynamic token enter into a sleep mode in case that no set waken flag exists, waiting for being waken up, and returning to Step S2;

in which the tooling communication process flow comprises:

Step Y1, turning off a general interrupt, determining whether data received currently is a waken signal sent by the tooling, if yes, returning a hand-shake signal to the tooling, continuing to receive communication data sent by the tooling, and executing Step Y2; otherwise, executing Step Y3;

Step Y2, determining a type of the data received currently, obtaining a random number from an obtaining-token-hardware-information command in case that the data received currently is the obtaining-token-hardware-information command, storing the random number, returning the obtained random number to the tooling, and executing Step Y3; decrypting a received tooling command according to the random number stored in the dynamic token in case that the data received currently is another tooling command, executing the decrypted command, and returning a result to the tooling, and executing Step Y3; otherwise, executing Step Y3; and Step Y3, setting the tooling-communication-waken flag, enabling the general interrupt, and ending the tooling communication process flow.

18. A working method of multi-seeded dynamic token, wherein said method comprises the steps of:

Step S1, powering on and initializing a dynamic token, turning on a general interrupt, setting a system state as a first preset state, making the dynamic token enter into a sleep mode, and the dynamic token waiting for being waken;

Step S2, waking up the dynamic token when an interrupt is detected, making the dynamic token enter into an interrupt process flow, and executing Step S3 after the interrupt process flow is finished; in which the interrupt process flow includes: determining, by the dynamic token, whether a key-interrupt flag is set, if yes, setting a button-waken flag and resetting the key-interrupt flag, and ending the interrupt process flow; otherwise, ending the interrupt process flow; a key interrupt is triggered when a key on the dynamic token is pressed, and the key-interrupt flag is set;

Step S3, checking, by the dynamic token, the button-waken flag, entering into the key process flow in case that the button-waken flag is set, reentering into the sleep mode when the key process flow is finished, waiting for being waken, and returning to Step S2;

in which the key process flow comprises:

Step a, obtaining, by the dynamic token, a key value, determining the key value and the system state, executing Step b in case that the key value is a first preset key value and the system state is a first preset state; executing Step c in case that the key value is a second preset key value and the system state is a second preset state; executing Step d in case that the key value is the second preset key value and the system state is a third preset state; executing Step e in case that the key value is the second preset key value and the system state is a fifth preset state; executing Step f in case that the key value is a third preset key value and the system state is the second preset state; executing Step g in case that the key value is the third preset key value and the system state is the third preset state; otherwise, executing Step h;

Step b, displaying, by the dynamic token, a function menu, initializing a function menu index, setting the system state as the second preset state, and executing Step h;

Step c, determining, by the dynamic token, an operation chosen by a user according to the function menu index, displaying a seed data menu, initializing a seed menu index, setting the system state as the third preset state and executing Step h in case that the operation chosen by the user is generating an OTP; obtaining and displaying a pre-stored serial number of the dynamic token, setting the system state as the fifth preset state and executing Step h in case that the operation chosen by the user is programming seed data;

Step d, reading, by the dynamic token, seed data, which is stored in the dynamic token and is arranged to correspond to the seed menu index, generating and displaying an OTP according to the read seed data, setting the system state as a sixth preset state, and executing Step h;

Step e, collecting, by the dynamic token, light sensor data, determining whether a serial number in the collected light sensor data matches the pre-stored serial number of the dynamic token, if yes, storing seed data which is in the collected light sensor data, and generating and displaying an OTP according to the latest stored seed data, setting the system state as the sixth preset state, and executing Step h; otherwise, clearing the collected light sensor data, obtaining and displaying the pre-stored serial number of the dynamic token, setting the system state as the fifth preset state, and executing Step h;

Step f, updating, by the dynamic token, the function menu index, and executing Step h;

Step g, updating, by the dynamic token, the seed menu index, and executing Step h; and Step h, resetting, by the dynamic token, the button-waken flag, and ending the key process flow;

wherein in case that the key-interrupt flag is not set in the interrupt process flow, the flow further comprises: determining whether a RTC-interrupt flag is set, if yes, setting a RTC-waken flag, resetting the RTC-interrupt flag, and ending the interrupt process flow; otherwise, ending the interrupt process flow; in which, when the RTC interrupt is triggered, the RTC-interrupt flag is set;

Step S3 is replaced as: determining, by the dynamic token, whether any set waken flag exists, if yes, checking the RTC-waken flag and the button-waken flag successively, entering into the key process flow in case that the button-waken flag is set, and executing Step S3 when the key process flow is finished; entering into the RTC process flow in case that the RTC-waken flag is set, and executing Step S3 when the RTC process flow is finished; if no, making the dynamic token enter into the sleep mode and waiting for being waken, and executing Step S2;

in which the RTC process flow comprises:

Step X1, decreasing, by the dynamic token, the number of RTC interrupt times progressively, determining whether the number of RTC interrupt times is a preset number of times, if yes, resetting the RTC-waken flag, and executing Step X2; otherwise, executing Step X2;

Step X2, increasing, by the dynamic token, a first parameter and a second parameter progressively, determining respectively whether the first parameter reaches a threshold of the first parameter and the second parameter reaches a threshold of the second parameter; setting the first parameter as its initial value and updating a first time factor stored in the dynamic token in case that the first parameter reaches its threshold; setting the second parameter as its initial value, updating a second time factor stored in the dynamic token and executing Step X3 in case that the second parameter reaches its threshold; executing Step X3 directly in case that neither the first parameter nor the second parameter reaches a corresponding threshold;

Step X3, updating, by the dynamic token, a calibration count value, and determining whether the first parameter equals a preset value, if yes, executing Step X4; otherwise, ending the RTC process flow; and Step X4, determining, by the dynamic token, whether the first parameter and the second parameter need to be calibrated according to the calibration count value and a calibration value pre-stored in the dynamic token, if yes, updating the first parameter, the second parameter and the calibration count value according to the calibration value and the calibration count value, ending the RTC process flow; otherwise, ending the RTC process flow;

wherein determining, by the dynamic token, whether the first parameter and the second parameter need to be calibrated according to the calibration count value and the calibration value pre-stored in the dynamic token specifically comprises: determining, by the dynamic token, whether a result obtained by performing an AND operation on the calibration value and 0x7F is less than the calibration count value, if yes, the first parameter and the second parameter need to be calibrated; otherwise, the first parameter and the second parameter do not need to be calibrated;

wherein updating the first parameter, the second parameter and the calibration count value according to the calibration value and the calibration count value specifically comprises: updating the calibration count value as a value obtained by subtracting the calibration value from a current value of the calibration count value, checking the most significant digit of the calibration value, updating the first parameter by subtracting 1 from a current value of the first parameter and updating the second parameter by subtracting 1 from a current value of the second parameter in case that the most significant digit of the calibration value is 1; updating the first parameter by adding 1 to the current value of the first parameter and updating the second parameter by adding 1 to the current value of the second parameter in case that the most significant digit of the second parameter is 0.

\* \* \* \* \*